Feb. 21, 1933.  E. BABCOCK  1,897,997
ABSORBER FOR REFRIGERATING SYSTEMS
Filed April 2, 1931
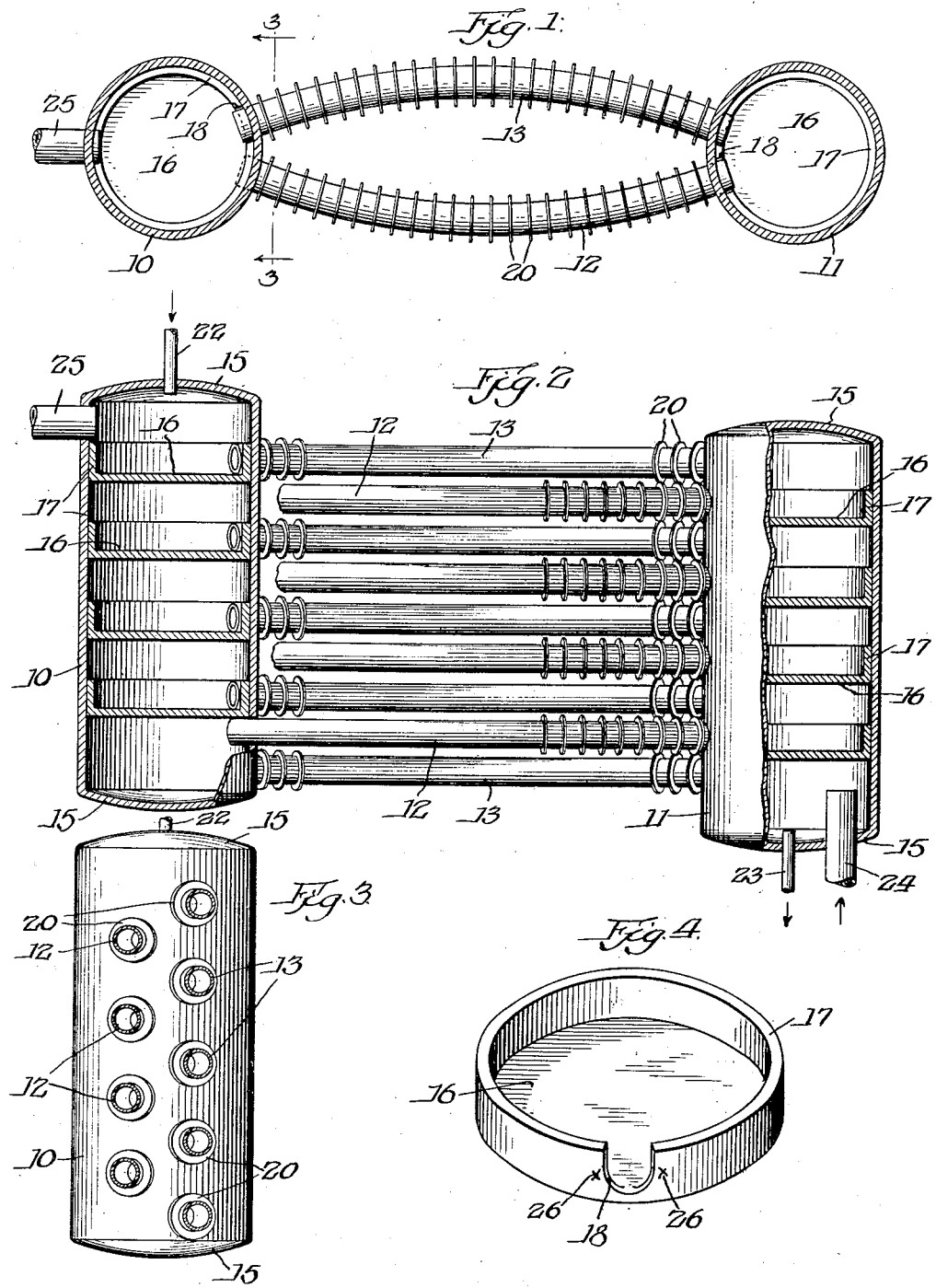
Witness:
R. B. Davison.
Inventor:
Earl Babcock.
By Harry S. Demarse
Atty Patented Feb. 21, 1933

1,897,997

UNITED STATES PATENT OFFICE

EARL BABCOCK, OF CHICAGO, ILLINOIS, ASSIGNOR TO THE HOOVER COMPANY, OF NORTH CANTON, OHIO, A CORPORATION OF OHIO

ABSORBER FOR REFRIGERATING SYSTEMS

Application filed April 2, 1931. Serial No. 527,073.

This invention relates to absorption refrigerating apparatus and more particularly to the part thereof known as the absorber.

In continuous absorption refrigerating apparatus such as that available on the market today in household and cabinet sizes, the absorber is usually water cooled because of the fact that the limited space available for mounting the absorber in the box or cabinet does not permit the use of an absorber of sufficient size to provide a large enough heat radiating surface to permit it to be cooled by air.

An object of the present invention is to provide an absorber construction which may occupy a rather narrow space along the side or the back of a refrigerator cabinet and yet provides a large heat radiating surface for transmitting heat to air which may be caused to circulate around the absorber by means of a fan or simply by the natural draft caused by the giving up of heat from the absorber to the air.

A further object is to provide an absorber construction in which a large internal area is provided so that an absorption liquid trickles thru the absorber it will present a large surface area to the refrigerant gas to be absorbed and thus promote efficient absorption.

While the invention is not necessarily limited to use in connection with an absorption refrigerating system employing an inert or neutral gas, another object of the invention is, nevertheless, to provide an absorber in which an inert gas laden with refrigerant gas may be caused to traverse a large area of absorption liquid, the fluids being so contained in the absorber as to provide a ready heat transfer to the atmosphere as the obsorption process takes place.

Another object is to attain the desired ends while providing a simple construction easy to assemble and fabricate and which may be easily and compactly assembled with other parts of a refrigerating system.

Other objects and advantages will be more apparent from the following description taken in connection with the accompanying drawing in which:

Fig. 1 is a horizontal cross-sectional view of an absorber built in accordance with the principles of the present invention;

Fig. 2 is a vertical view of the same, certain of the parts being cut away to illustrate a possible internal construction;

Fig. 3 is a vertical cross-sectional view taken on the lines 3—3 of Fig. 1 and

Fig. 4 is a perspective view, of a baffle tray or plate employed in the construtcion of the absorber.

Referring to the drawing, an absorber is there shown as consisting fundamentally of two vertically disposed cylinders 10 and 11 interconnected by two sets of curved pipes designated 12 and 13. Each of the cylinders 10 and 11 is closed at the top and bottom by suitable heads which are preferably curved as shown at 15 and each is provided with a number of plates or trays disposed one above the other on the inside, the number of trays depending upon the height of the cylinders. The trays in the two cylinders are just alike and as best shown in Figure 4 consist of a piece of sheet metal in the shape of a disk designated 16 provided with a flange portion 17 which is cut at one side as illustrated at 18 to provide a slot of approximately the depth of the flange. The diameter of the top of the flange 17 may be slightly larger than the bottom so as to provide a tight fit with the cylinders 10 and 11 when the tray is sprung into position.

The trays 16 may be formed by stamping sheet metal or in any other suitable manner. They are so spaced in the cylinders 10 and 11 as to permit the connection of two pipes, that is one pipe of the series 12 and one pipe of the series 13, to the cylinder in between any given two.

In the construction shown in Figure 2 there are five pipes designated 13 and four pipes designated 12 interconnecting the cylinders 10 and 11. Each of these pipes extends thru holes in the walls of the cylinders 10 and 11, the pipes being so bent or curved as to have the portion which enters the cylinder substantially radially disposed with respect to it so that the same may readily be welded or otherwise sealed to the cylinder. As will be apparent from Figures 1 and 3 the holes in the cylinders are staggered so as to provide a strong construction, effect an economy of space, and at the same time make provision for exposing large portions of the pipes 12 and 13 to the air.

In the cylinder 10 the upper four pipes of the series 13 enter thru the slots 18 of the baffle plates or trays 16 as well as thru holes in the cylinder walls. In the cylinder 11, on the other hand, all of the pipes of the series 12 enter thru the slot 18 of the trays in that vessel. The ends of these pipes which are not disposed in the slots 18 of the trays 16 extend thru the walls of the cylinders at points in between the trays. Thus the upper pipe of the series 13 shown in Figure 2 extends thru the slot in the upper tray 16 in the vessel 10 but is disposed above the flange of the upper tray 16 in the vessel 11 while the upper pipe of the series 12 extends thru the slot in the upper plate 16 in the vessel 11 while it enters the vessel 10 at a point in between the first and second trays of that vessel etc.

It will thus be seen that the heads 15 and the plates 16 form a plurality of compartments or chambers in the vessels 10 and 11 and that these chambers are connected in series by means of the pipes 12 and 13. The lowermost pipe 13 is the only one which does not have one end disposed in a slot 18 of a tray 16. This pipe merely connects the two lower chambers of the cylinders 10 and 11.

To provide for the flow of absorption liquid thru the absorber an inlet pipe 22 is connected to the top of the vessel 10 and an outlet pipe for the liquid is connected to the bottom of the vessel 11 as shown at 23. In the form of apparatus shown, means is also provided for the circulation of inert gas thru the absorber, although it will be readily understood that the invention is not limited to refrigerating apparatus employing inert gas. As shown however, a gas inlet conduit 24 is connected to the bottom of the cylinder 11 and a gas outlet conduit 25 is connected to the upper chamber of the cylinder 10. With this construction the gas flowing thru the absorber travels in the opposite direction to that of the absorption liquid. The gas entering thru the conduit 24 flows thru the chamber of the cylinder 11 formed by the lower head 15 and the lower plate 16, then thru the lower pipe 13 into the lowermost chamber of the cylinder 10 formed by the lower head 15 and lower plate 16 of that cylinder, then thru the lower pipe 12 to the chamber formed by the two lower plates 16 in the cylinder 11, then thru the next to the lower pipe 13 into the chamber formed by the two lower trays 16 in the cylinder 10 and so on, alternately passing from one cylinder to the other as it travels upwardly thru the absorber and out thru the conduit 25. The liquid on the other hand enters thru the conduit 22 and flows downwardly by gravity. After first passing thru the chamber formed by the upper head 15 and upper plate 16 of the vessel 10 it passes thru the upper pipe of the series 13 into the upper chamber of the vessel 11 formed by the head 15 and upper plate 16 thereof and then thru the upper pipe of the series 12 into the chamber formed by the two upper plates 16 in the vessel 10 etc. Pools of liquid are formed and maintained upon each of the plates 16 because of the fact that the pipes 12 and 13 which extend thru the slots of these trays operate as overflows for them. Thus the depth of each pool on any given tray is substantially equal to the thickness of the pipes 12 and 13.

In order to prevent liquid from leaking from one tray 16 into another in a given cylinder around a slot 18 it is preferable to weld or otherwise secure the tray to the cylinder at this point. A convenient way of doing this is to spot-weld the portions of the flange 17 immediately adjacent the slot 18 to the walls of the cylinder. Referring to Figure 4, the numerals 26 designate cross marks upon the flange 17 located at points which should be welded to the wall of the cylinder.

It will be apparent from the above description that in the cylinder 10 the slots 18 on the flanges 17 of the trays 16 should be in alinement with the holes in the wall of the cylinder to which the pipes 13 are to be fitted whereas in the cylinder 11 the slots 18 should be in alinement with the holes into which the pipes 12 are to be fitted. In assembling the various parts of the absorber, cylinders 10 and 11 which may be pieces of steel pipe are preferably first provided with holes at the proper points adapted to receive the pipes 12 and 13. The trays 16 are then welded or otherwise secured in position and the head 16 welded thereon. The pipe 13 which may be cut and bent from commercial stock pipe may then be fitted into the holes provided in the cylinders 10 and 11 and welded thereto. Seamless steel pipe like that illustrated with heat radiating fins crimped or otherwise rigidly secured thereto is now available on the market. Such material may be used for the pipes 12 and 13 if desired. Heat radiating fins 20 are shown attached to the pipes 12 and 13 in Figures 1 and 3. Some fins are also shown in Figure 2. In assembling these pipes with the cylinders 10 and 11, all may be welded to either cylinder first and then the other fitted in position and the pipes welded thereto or if desired both ends of a pipe may be welded to the cylinders and then another pipe welded to both etc. Of course with the latter method it will perhaps be necessary to remove one or more fins from the pipe so that it may be shoved some distance inwardly of one cylinder to enable the other end to be brought into its proper position. The pipes 12 and 13 are preferably welded to the cylinders 10 and 11 from the outside in accordance with well known methods.

From the above it will be seen that the absorber may be so constructed as to provide a large heat radiating surface on the outside and a large surface of contact between absorption liquid and refrigerant gases on the inside while occupying a comparatively narrow space along the side or back of a refrigerator cabinet. The space between the pipes 12 and 13 may be utilized for passing pipes from the upper to the lower portion of the refrigerator unit, as for example from the condenser to the boiler, so that the cylinders 10 and 11 may be spaced as far apart as the dimensions of the box permit.

It is obvious that the dimensions of the absorber or the parts thereof may be varied over a wide range. Also various changes may be made in the details of the construction. For example if desired the cylinders 10 and 11 may be provided with vertically extending tubes thru their central portions to provide additional heat radiating surface as shown and described in the copending application of Rudolph S. Nelson, Serial No. 527,146 filed on even date herewith and if desired the vessels 10 and 11 may be indirectly cooled in accordance with the method disclosed in that application.

As noted above the absorber is particularly suited for use in absorption systems in which an inert gas is employed. The system may be of the type shown in the copending application of Rudolph S. Nelson mentioned above to which the reader is referred for a disclosure of the complete system, or it may be of the resorber type as disclosed in the copending application of Rudolph S. Nelson, Serial No. 508,572, filed January 14, 1931, for "an absorption refrigerating apparatus."

A vessel constructed as described above may also be adapted for use as an evaporator in certain types of refrigerating systems. Various changes may be made without departing from the spirit of the invention or the scope of the annexed claims.

I claim:—

1. An absorber for refrigerating apparatus comprising a plurality of vertically disposed cylinders, spaced plates located in said cylinders and dividing the same into compartments, a plurality of pipes for connecting said compartments in series in staggered relation so that a compartment in one cylinder is connected to a compartment in another cylinder and a compartment in the last mentioned cylinder is connected to a compartment in the first mentioned cylinder and means for circulating gas through said compartments and pipes, the arrangement being such that the gas will pass through a compartment and then through a pipe into a compartment into another cylinder.

2. An absorber for refrigerating apparatus comprising two vertically disposed cylinders closed at the top and bottom, a plurality of trays in each cylinder for dividing same into compartments, each tray being adapted to retain a pool of absorption liquid thereon, a plurality of pipes connecting said compartments in series with a compartment in one cylinder connected to a compartment in the other cylinder and with the last mentioned compartment connected to a third compartment in said first mentioned cylinder each of said pipes being adapted to convey gas from a compartment in one cylinder to a compartment in another cylinder and to bring said gas into heat discharge relation with a cooling medium as it so conveys the same to thereby facilitate the removal of heat from said gas.

3. A vessel adapted for use as an absorber in a refrigerating system comprising means for forming two vertical rows of chambers, a plurality of conduits, each connecting the bottom portion of a chamber of one row to the top of a chamber of another row thereby connecting said chambers in series, means for supplying a gas to the lower chamber of one row, means for removing gas from the upper chamber of another row, means for supplying absorption liquid to the upper chamber of one row and means for removing liquid from the lower chamber of the other row whereby gas and liquid are caused to flow thru said vessel in opposite directions.

4. In combination, a pair of parallel cylinders, a plurality of trays in each cylinder for dividing it into compartments, a plurality of conduits interconnecting the cylinders and each connecting the lower portion of a compartment of one cylinder to the upper portion of the compartment of the other cylinder to thereby connect the compartments in series relation, means for supplying a liquid to the compartments of said cylinders and means for circulating an inert gas through said compartments and said conduits.

5. In combination, a pair of parallel cylinders, a plurality of trays in each cylinder for dividing it into compartments, a plurality of conduits interconnecting the cylinders and each connecting the lower portion of a compartment of one cylinder to the upper portion of the compartment of the other cylinder to thereby connect the compartments in series relation, means for supplying absorption liquid to the compartments of said cylinders and to said conduits and means for supplying refrigerant gas to said compartments and conduits whereby said refrigerant gas may be absorbed by the absorption liquid therein.

6. An absorber for a refrigerating system comprising a pair of spaced vertically disposed cylindrical vessels, a plurality of partitions in each vessel for dividing it into compartments and a plurality of pipes connecting the compartments of said vessels in series with each other, said pipes being bowed to provide a vertical passageway in between said vessels for the passage of other pipes of the refrigerating system.

7. An absorber for a refrigerating system comprising a plurality of spaced vertically disposed cylindrical vessels, a plurality of partitions in each vessel for dividing it into compartments and a plurality of pipes connecting said vessels together and connecting the compartments thereof in series relation, said pipes being so bent as to provide staggered points of connection with any given vessel and to permit the ends which are connected to the vessel to be substantially at right angles to the wall thereof.

8. An absorber for a refrigerating system comprising a plurality of spaced vertically disposed cylindrical vessels, a plurality of flanged trays in each vessel for dividing the same into compartments and for providing for the formation of a number of shallow pools of liquid therein upon liquid being supplied to the absorber, each of said trays having a slot formed in its flanged portion, a plurality of pipes connecting said vessels together and connecting the compartments formed by said trays in series relation, said pipes having their end portions disposed in said vessels and each having one end disposed in the slot in one of said trays whereby the pipes may act as overflow conduits for liquid on said trays.

Signed at Chicago, in the county of Cook, and State of Illinois, this 31st day of March, A. D. 1931.

EARL BABCOCK.